(12) United States Patent
Yamamoto et al.

(10) Patent No.: US 8,526,099 B2
(45) Date of Patent: Sep. 3, 2013

(54) METHOD FOR MANUFACTURING MICROCAPSULES, AND MICROCAPSULE, ELECTROPHORETIC DEVICE AND ELECTRIC APPARATUS

(75) Inventors: Hitoshi Yamamoto, Chino (JP); Takeo Kawase, Suwa (JP); Toshiyuki Miyabashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1415 days.

(21) Appl. No.: 11/379,333

(22) Filed: Apr. 19, 2006

(65) Prior Publication Data

US 2006/0256423 A1 Nov. 16, 2006

(30) Foreign Application Priority Data

Apr. 19, 2005 (JP) ................................ 2005-121761
Mar. 23, 2006 (JP) ................................ 2006-081712

(51) Int. Cl.
*G02B 26/00* (2006.01)
*B01J 13/02* (2006.01)
*B32B 29/06* (2006.01)

(52) U.S. Cl.
USPC ........... 359/296; 359/237; 359/250; 359/253; 427/213; 427/213.34; 428/402.24; 428/402.21

(58) Field of Classification Search
USPC ....................... 427/389.9, 213.3–213.36, 483; 428/402–402.24, 407, 403, 423.1, 474.4; 359/296, 237, 250, 253, 265–273, 315; 349/86, 349/90, 296
See application file for complete search history.

(56) References Cited

U.S. PATENT DOCUMENTS

| | | | |
|---|---|---|---|
| 4,268,456 A | 5/1981 | Keim et al. | |
| 6,577,433 B1 * | 6/2003 | Lin et al. | 359/296 |
| 6,844,958 B2 * | 1/2005 | Kawai | 359/296 |
| 7,253,216 B2 | 8/2007 | Miyabayashi | |
| 2001/0005567 A1 * | 6/2001 | Harada et al. | 430/32 |
| 2003/0078320 A1 * | 4/2003 | Yatake | 523/160 |
| 2004/0257330 A1 * | 12/2004 | Minami | 345/107 |
| 2004/0265589 A1 * | 12/2004 | Yamada et al. | 428/402.21 |
| 2005/0075416 A1 | 4/2005 | Miyabayashi | |

FOREIGN PATENT DOCUMENTS

| | | |
|---|---|---|
| JP | 46-034898 | 10/1971 |
| JP | 40-046291 | 12/1974 |
| JP | 51-030284 | 3/1976 |
| JP | A 55-011525 | 1/1980 |
| JP | A 62-034947 | 2/1987 |
| JP | A 62-104802 | 5/1987 |
| JP | A 62-221431 | 9/1987 |
| JP | A 64-086116 | 3/1989 |
| JP | B2 01-024142 | 5/1989 |
| JP | A-05-113558 | 5/1993 |
| JP | A 05-320276 | 12/1993 |
| JP | B2 2551783 | 8/1996 |
| JP | A 10-316909 | 12/1998 |
| JP | A-2003-290647 | 10/2003 |
| JP | A-2005-097518 | 4/2005 |

* cited by examiner

*Primary Examiner* — James J Seidleck
*Assistant Examiner* — S. Camilla Pourbohloul
(74) *Attorney, Agent, or Firm* — Oliff & Berridge, PLC (57) ABSTRACT

A method for manufacturing microcapsules is provided. The microcapsules each include an electrophoretic dispersion liquid containing at least one type of electrophoretic particles in a dispersion medium, and a capsule body made of an organic polymer and containing the electrophoretic dispersion liquid. The method includes forming droplets of the electrophoretic dispersion liquid by dispersing the electrophoretic dispersion liquid in an polar dispersion medium, and forming the capsule bodies by mixing a polymerization initiator and a polymerizable surfactant having a hydrophilic group, a hydrophobic group and a polymerizable group with the polar dispersion medium so as to coat the droplets with the polymerizable surfactant and induce a polymerization reaction to form the organic polymer.

20 Claims, 8 Drawing Sheets

METHOD FOR MANUFACTURING MICROCAPSULES, AND MICROCAPSULE, ELECTROPHORETIC DEVICE AND ELECTRIC APPARATUS

BACKGROUND

1. Technical Field

The present invention relates to a method for manufacturing microcapsules, and to a microcapsules, an electrophoretic device and an electric apparatus.

2. Related Art

It is generally known that an electric field is applied to a disperse system prepared by dispersing particles in a liquid, the particles are transferred (migrated) in the liquid by the Coulomb force. This phenomenon is called electrophoresis. Electrophoretic device s that display desired information (images) with use of the electrophoresis have been thought of for a new type of display device.

Electrophoretic device s have some advantages. For example, they can memorize information on the screen even with no voltage applied, have wide viewing angles, and display high-contrast images.

The electrophoretic device is of non-light-emitting type, and is accordingly soft to eyes in comparison with light-emitting display devices, such as cathode ray tubes.

For example, Japanese Patent No. 2551783 has disclosed a microcapsules electrophoretic device including a pair of substrates each having an electrode, a plurality of microcapsules between the substrates, and a binder fixing the substrates and the microcapsules. Each microcapsules contains an electrophoretic dispersion liquid in which electrophoretic particles are dispersed in a dispersion medium.

In general, the microcapsules of the electrophoretic dispersion liquid are prepared by coacervation using gelatin and gum arabic.

Unfortunately, if the electrophoretic device using the microcapsules is subjected to a 24-hour humidity test at 80° C. and 90% RH, it becomes out of order due to the increase of the water content in the electrophoretic dispersion liquid.

SUMMARY

An advantage of the present invention is that it provides a method for manufacturing moisture-resistant microcapsules, a microcapsules produced by the method, and a highly reliable electrophoretic device and electric apparatus.

According to an aspect of the invention, a method for manufacturing microcapsules each of which includes an electrophoretic dispersion liquid containing at least one type of electrophoretic particles in a dispersion medium, and a capsule body made of an organic polymer and containing the electrophoretic dispersion liquid. The method includes forming droplets of the electrophoretic dispersion liquid by dispersing the electrophoretic dispersion liquid in an polar dispersion medium, and forming the capsule bodies by mixing a polymerization initiator and a polymerizable surfactant having a hydrophilic group, a hydrophobic group and a polymerizable group with the polar dispersion medium so as to coat the droplets with the polymerizable surfactant and induce a polymerization reaction to form the organic polymer.

According to another aspect of the invention, a method for manufacturing microcapsules each of which includes an electrophoretic dispersion liquid containing at least one type of electrophoretic particles in a dispersion medium, and a capsule body made of an organic polymer and containing the electrophoretic dispersion liquid. The method includes forming droplets of the electrophoretic dispersion liquid by dispersing the electrophoretic dispersion liquid in an polar dispersion medium, and forming the capsule bodies by mixing a polymerizable surfactant having a hydrophilic group, a hydrophobic group and a polymerizable group, a comonomer polymerizable with the polymerizable surfactant, and a polymerization initiator with the polar dispersion medium so as to coat the droplets with the polymerizable surfactant and the comonomer and induce a polymerization reaction to form the organic polymer.

The comonomer may be at least either a hydrophilic monomer or a hydrophobic monomer.

The hydrophobic monomer may have a hydrophobic group and a polymerizable group in its molecule, and the hydrophilic group is selected from the group consisting of sulfonic, sulfonic, carboxyl and carbonyl groups and their salts, hydroxy group, oxyethylene group, amido group, and amino group.

The hydrophobic monomer may have a hydrophobic group and a polymerizable group in its molecule. The hydrophobic group can be selected from the group consisting of, aliphatic hydrocarbon groups, alicyclic hydrocarbon groups, and aromatic hydrocarbon groups.

The comonomer may have an unsaturated hydrocarbon group capable of radical polymerization.

The unsaturated hydrocarbon group capable of radical polymerization may be selected from the group consisting of vinyl, allyl, acryloyl, methacryloyl, propenyl, vinylidene, and vinylene.

The dispersion medium may be an organic solvent having a lower polarity than the polar dispersion medium.

The organic solvent can be selected from the group consisting of aromatic hydrocarbons, aliphatic hydrocarbons, hydrocarbon mixtures, halogenated hydrocarbons, silicone oils, and fluorinated solvents.

The polymerizable group of the polymerizable surfactant may be an unsaturated hydrocarbon group capable of radical polymerization.

The unsaturated hydrocarbon group of the polymerizable surfactant is selected from the group consisting of vinyl, allyl, acryloyl, methacryloyl, propenyl, vinylidene, and vinylene.

If the polymerizable surfactant has such an unsaturated hydrocarbon group, the hydrophilic group of the polymerizable surfactant can be at least either an anionic group or a nonionic group.

The anionic group may be selected from the group consisting of sulfonic, sulfonic, carboxyl and carbonyl groups and their salts.

The nonionic group may be selected from the group consisting of hydroxy and oxyethylene groups.

The hydrophobic group of the polymerizable surfactant may be at least either an alkyl group or an aryl group.

The hydrophobic group of the polymerizable surfactant may be compatible with the dispersion medium.

According to another aspect of the invention, a microcapsules is provided which is manufactured by any one of the above-described methods.

According to another aspect of the invention, an electrophoretic device is provided which include a transparent substrate, an opposing substrate opposing the transparent substrate, and the above-described microcapsules disposed between the transparent substrate and the opposing substrate.

According to another aspect of the invention, an electric apparatus including the electrophoretic device is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the method for manufacturing microcapsules, the microcapsules, the electrophoretic device and the electric apparatus of the present invention will now be described with reference to the drawings.

First Embodiment

An electrophoretic device according to a first embodiment of the present will be described below.

Figure 1:
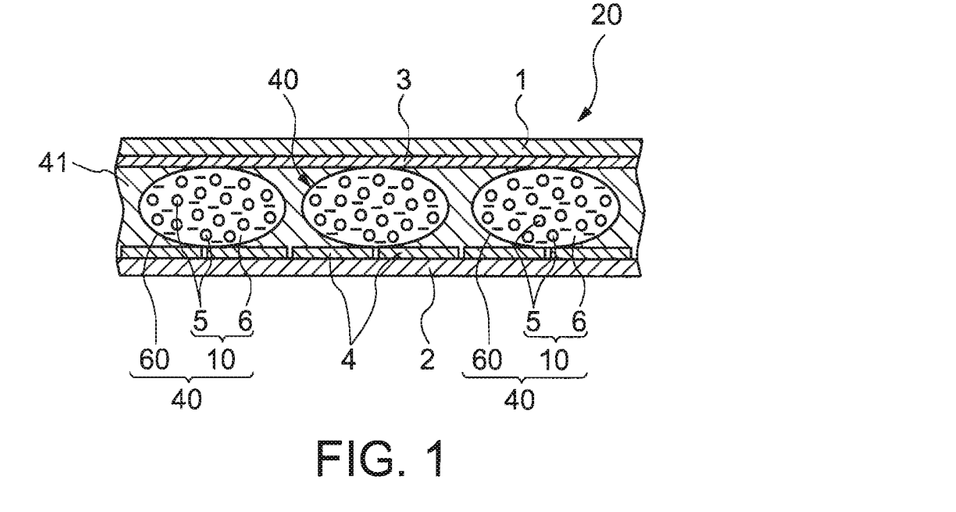
FIG. 1 is a longitudinal sectional view of an electrophoretic device according to a first embodiment of the invention.
Figure 2A:
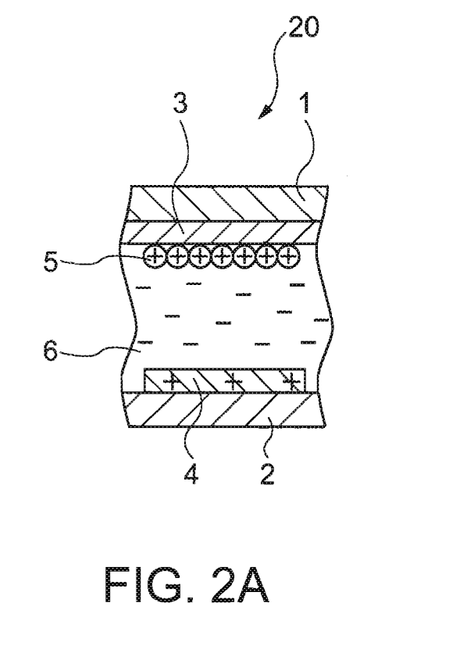
FIGS. 2A and 2B are schematic representations of the operational principle of the electrophoretic device shown in FIG. 1.
Figure 2B:
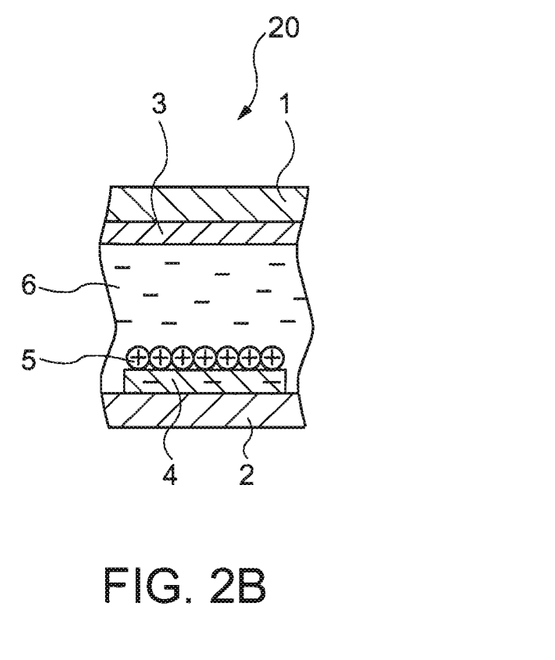

FIG. 1 is a longitudinal sectional view of the electrophoretic device according to the first embodiment, and FIGS. 2A and 2B are schematic representations of the operational principle of the electrophoretic device shown in FIG. 1.

For the sake of easy understanding, the upper side and the lower side in FIGS. 1 and 2A and 2B (and the subsequent figures) are respectively described as being in an upper position and a lower position.

The electrophoretic device 20 shown in FIG. 1 includes a first substrate 1 with a first electrode 3, a second substrate 2 with a second electrode 4 opposing the first electrode 3, and a plurality of microcapsules 40 disposed between the first substrate 1 and the second substrate 2. These components will be described one by one below.

The first substrate 1 and the second substrate 2 are each formed in a sheet (or flat plate) and intended to hold and protect the members disposed between them.

The substrates 1 and 2 may be flexible or inflexible, but preferably flexible. Flexible substrates 1 and 2 lead to a flexible electrophoretic device 20, which can be advantageously used to provide an electric paper.

Materials used for the flexible substrates 1 and 2 include: polyolefins, such as polyethylene, polypropylene, and ethylene-vinyl acetate copolymers; modified polyolefins; polyamides, such as nylon 6, nylon 46, nylon 66, nylon 610, nylon 612, nylon 11, nylon 12, nylon 6-12, and nylon 6-66; thermoplastic polyimides; liquid crystal polymers, such as aromatic polyesters polyphenylene oxides; polyphenylene sulfides; polycarbonates; polymethyl methacrylates; polyethers; polyether ether ketones; polyether imides; polyacetals; thermoplastic elastomers, such as of styrene, polyolefin, polyvinyl chloride, polyurethane, polyester, polyamide, polybutadiene, trans-polyisoprene, fluorocarbon rubber, and chlorinated polyethylene; and their copolymers, mixtures and polymer alloys. These materials may be used singly or in combination.

The thicknesses (average thicknesses) of the substrates 1 and 2 are appropriately set according to the material, the application, and other factors without particular limitation. For example, flexible substrates preferably have thicknesses of about 20 to 500 µm, more preferably about 25 to 250 µm so as to give the electrophoretic device 20 a harmony of flexible and strength and to downsize the electrophoretic device 20 (particularly to reduce the thickness).

The surfaces of the substrates 1 and 2 opposing the microcapsules 40, that is, the lower surface of the first substrate 1 and the upper surface of the second substrate 2, are provided with layers acting as the first electrode 3 and the second electrode 4, respectively.

By applying a voltage between the first electrode 3 and the second electrode 4, an electric field is generated between these electrodes. The electric field acts on the electrophoretic particles 5.

In the present embodiment, the first electrode 3 is a single electrode. The second electrode 4 is divided into discrete portions in a matrix manner, and each portion serves as a discrete electrode (pixel electrode). Each discrete electrode of the second electrode 4 and the portion of the first electrode 3 overlying the discrete electrode define a pixel. The first electrode 3 may also be divided into a plurality of portions as the second electrode 4 is.

The electrodes 3 and 4 can be made of any material substantially having electroconductivity. Examples of such a material include metals, such as copper, aluminum, nickel, cobalt, platinum, gold, silver, molybdenum, tantalum, and their alloys; carbon-based materials, such as carbon black, carbon nanotubes, and fullerenes; electron-conductive polymers, such as polyacetylene, polypyrrole, polythiophene, polyaniline, poly(p-phenylene), poly(p-phenylene vinylene), polyfluorene, polycarbazole, polysilane, and their derivatives; ion-conductive polymers prepared by dispersing ionic constituents, such as NaCl, $TiClO_4$, KCl, $H_2$, LiCl, LiBr, LiI, $LiNO_3$, LiSCN, $LiCF_3SO_3$, NaBr, NaI, NaSCN, $NaClO_4$, $NaCF_3SO_3$, KI, KSCN, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $CaBr_2$, $CaI_2$, $CaSCN_2$, $Ca(ClO_4)_2$, $Ca(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, and $Cu(CF_3SO_3)_2$, in matrix resins, such as polyvinyl alcohol, polycarbonate, polyethylene oxide, polyvinyl butyral, polyvinyl carbazole, and vinyl acetate; and electroconductlye oxides, such as indium tin oxide (ITO), fluorine-doped tin oxide (FTO), tin oxide ($SnO_2$), and indium oxide IO). These materials may be used singly or in combination.

The electrodes 3 and 4 may be made of an electroconductive composite material prepared by mixing an electroconductive material (electroconductive particles), such as gold, silver, nickel, or carbon, to a non-electroconductive material, such as glass, rubber, or a polymer.

Such composite materials include conductive rubbers containing electroconductive constituents in rubber; conductive adhesives or pastes containing electroconductive constituents in compositions of adhesives, such as those of epoxy, urethane, and acrylic; and electroconductive resins containing electroconductive materials in matrix resins, such as polyolefin, polyvinyl chloride, polystyrene, ABS, nylon (polyamide), ethylene-vinyl acetate copolymer, polyester, acrylic resin, epoxy resin, and urethane resin.

The thicknesses (average thicknesses) of the electrodes 3 and 4 are appropriately set according to the material or the application without particular limitation, but are preferably about 0.05 to 10 μm, more preferably about 0.05 to 5 μm.

Preferably, the substrate and electrode on the displaying side (the first substrate 1 and the first electrode 3 in the present embodiment) of the substrates 1 and 2 and the electrodes 3 and 4 each have optical transparency, and specifically are substantially transparent (colorless, colored, or clouded). Consequently, the state of the electrophoretic particles 5 in the below-described electrophoretic dispersion liquid 10, that is, the information (image) on the electrophoretic device 20, can be easily recognized visually.

The electrodes 3 and 4 each may be composed of a single layer of any one of the above-described materials, or a plurality of layers of some of the materials. For example, the electrodes 3 and 4 each may have an ITO single-layer structure or a two-layer structure composed of an ITO layer and a polyaniline layer.

The microcapsules 40 are disposed between the first electrode 3 and the second electrode 4, and fixed by a binder 41.

The binder 41 not only fixes the microcapsules 40, but also ensures insulation between the electrodes 3 and 4 so as to enhance the durability and reliability of the resulting electrophoretic device 20.

For the binder 41, insulative resins having affinity for the electrodes 3 and 4 and the microcapsules 40 (capsule bodies 60) are suitably used.

Such insulative resins include, but not limited to: thermoplastic resins, such as polyethylene, chlorinated polyethylene, ethylene-vinyl acetate copolymer, ethylene-ethyl acrylate copolymer, polypropylene, ABS resin, methyl methacrylate, vinyl chloride, vinyl chloride-vinyl acetate copolymer, vinyl chloride-vinylidene chloride copolymer, vinyl chloride-acrylic ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride, vinyl acetate, polyvinyl alcohol, polyvinyl formal, and cellulose-based resins; polymers, such as polyamide-based resins, polyacetal, polycarbonate, polyethylene terephthalate, polybutylene terephthalate, polyphenylene oxide, polysulfone, polyamide imide, polyaminobismaleimide, polyether sulfone, polyphenylene sulfone, polyacrylate, grafted polyphenylene ether, polyether ether ketone, and polyether imide; fluorocarbon resins, such as polytetrafluoroethylene, polyfluoroethylenepropylene, tetra-polyethylene-perfluoroalkoxyethylene copolymer, ethylene-tetrafluoroethylene copolymer, polyfluorovinylidene, polytrifluoroethylene chloride, and fluorocarbon rubber; silicone resins including silicone rubber; and other copolymers, such as methacrylic acid-styrene copolymer, polybutylene, and methyl methacrylate-butadiene-styrene copolymer. These resins may be used singly or in combination.

Preferably, the dielectric constant of the binder 41 is set to be substantially equal to that of the dispersion medium 6 used for preparing the below-described electrophoretic dispersion liquid 10. It is therefore preferable that the binder 41 contain a dielectric constant adjuster. Exemplary dielectric constant adjusters include alcohols, such as 1,2-butanediol and 1,4-butanediol, ketones, and carboxylates.

The microcapsules 40 each include an electrophoretic dispersion liquid 10 and a capsule body (capsule shell) 60 enclosing the electrophoretic dispersion liquid 10.

The electrophoretic dispersion liquid 10 is prepared by dispersing (suspending) at least one type of electrophoretic particles 5 in a dispersion medium 6.

The electrophoretic particles 5 are formed of a variety of materials without particular limitation. Preferably, the electrophoretic particles 5 mainly contain at least one material selected from the group consisting of pigments, resins, ceramics, metals, metal oxides, and their mixtures. These materials facilitate the manufacture.

The electrophoretic particles 5 may be composite particles containing at least two types of the above-listed materials.

Exemplary pigments include black pigments, such as aniline black, carbon black, and titanium black; white pigments, such as titanium dioxide, antimony trioxide, barium sulfate, zinc sulfide, hydrozincite, and silicon dioxide; azo pigments, such as monoazo, disazo, and polyazo; yellow pigments, such as isoindolinone, chrome yellow, yellow iron oxide, cadmium yellow, titanium yellow, and antimony yellow; red pigments, such as quinacridone red and chrome vermilion; blue pigments, such as phthalocyanine blue, indanthrene blue, Prussian blue, ultramarine blue, and cobalt blue; green pigments, such as phthalocyanine green. These pigments may be used singly or in combination.

Exemplary resins include acrylic resin, urethane resin, urea resin, epoxy resin, polystyrene, and polyester. These resins may be used singly or in combination.

The composite particles may be, for example, pigment particles coated with a resin, or resin particles coated with a pigment.

Preferably, the electrophoretic particles 5 partially have repellency at their surfaces. Consequently, when the electrophoretic dispersion liquid 10 containing the electrophoretic particles 5 is dispersed in an polar dispersion medium 90 in the below-described process for manufacturing the microcapsules 40, the electrophoretic particles 5 are certainly prevented from transferring to the polar dispersion medium 90. Thus, microcapsules 40 containing an intended electrophoretic dispersion liquid 10 can be certainly prepared.

The electrophoretic particles 5 preferably have an average particle size of about 0.1 to 10 μm, and more preferably about 0.1 to 7.5 μm. Electrophoretic particles 5 having an excessively small average particle size are liable to aggregate. On the other hand, particles having an excessively large average particle size may be difficult to electrophorese, depending on the type.

The dispersing of the electrophoretic particles 5 into the dispersion medium 6 is performed, for example, in a paint shaker, a ball mill or a media mill, or by ultrasonic waves or agitation. Some of these techniques may be combined for the dispersion.

The dispersion medium 6 is preferably an organic solvent exhibiting a relatively high insulation property and having a lower polarity than the polar dispersion medium used in the manufacturing process of the microcapsules 40.

The dispersion medium 6 is selected from the group consisting of: aromatic hydrocarbons including benzene hydrocarbons, such as benzene, toluene, o-xylene, m-xylene, p-xylene, mixed xylene, ethylbenzene, hexylbenzene, dodecylbenzene, and phenylxylylethane; aliphatic hydrocarbons including paraffin hydrocarbons such as n-hexane and n-decane, isoparaffin hydrocarbons such as Isopar (produced by Exxon Chemical), olefins such as 1-octene and 1-decene, and naphthenes such as cyclohexane and decalin; petroleum or petroleum-derived hydrocarbon mixtures, such as kerosine, petroleum ether, petroleum benzin, ligroin, industrial petrol, coal-tar naphtha, petroleum naphtha, and solvent naphtha; halogenated hydrocarbons, such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chloro benzene, o-dichlorobenzene, bromobenzene, iodomethane, diiodomethane, and iodoform; silicone oils, such as dimethylsilicone oil and methylphenylsilicone oil; and fluorinated organic solvents, such as hydrofluoro ether.

The dispersion medium 6 facilitates the electrophoresis of the electrophoretic particles 5. The dispersion medium 6 also helps to form droplets of the electrophoretic dispersion liquid 10 in the polar dispersion medium, and thus to certainly prepare the microcapsules 40, in the below-described manufacturing process of the microcapsules 40.

Among the above-listed organic solvents, preferred are long chain alkyl benzenes, such as hexylbenzene and dodecylbenzene, and phenylxylylethane. These solvents have high boiling points and flash points and are less toxic.

Other examples of the dispersion medium 6 include cellosolves, such as methylcellosolve, ethylcellosolve, and phenylcellosolve; esters, such as methyl acetate, ethyl acetate, butyl acetate, and ethyl formate; ketones, such as acetone, methyl ethyl ketone, diethyl ketone, methyl isobutyl ketone, methyl isopropyl ketone, and cyclohexanone; alicyclic hydrocarbons, such as cyclohexane and methylcyclohexane; heteroaromatic compounds, such as pyridine, pyrazine, furan, pyrrole, thiophene, and methylpyrrolidone; nitriles, such as acetonitrile, propionitrile, and acrylonitrile; amides, such as N,N-dimethylformamide and N,N-dimethylacetamide; and carboxylates.

The dispersion medium 6 (or the electrophoretic dispersion liquid 10) may contain additives, if necessary. The additives include electrolytes, surfactants, metallic soaps, resins, rubbers, oils, varnishes, charge control agents constituted of, for example, particles of compounds, dispersants such as titanium-based, aluminum-based and silane-based coupling agents, lubricants, and stabilizing agents.

The dispersion medium 6 may further contain a dye, such as an anthraquinone dye, an azo dye, an indigoid dye, a triphenylmethane dye, a pyrazolone dye, stilbene dye, a diphenylmethane dye, a xanthene dye, an alizarin dye, an acridine dye, a quinonimine dye, a thiazole dye, a methine dye, a nitro dye, or a nitroso dye, if necessary.

The capsule body 60 is made of an organic polymer, as described later, and the molecule of the organic polymer has a plurality of hydrophobic groups to enhance the hydrophobicity. Accordingly, the microcapsules 40 has so high a moisture resistance as to prevent the water constant in the electrophoretic dispersion liquid 10 from increasing with time. Consequently, the characteristics (working speed) of the resulting electrophoretic device 20 can be certainly prevented from decreasing.

The method for manufacturing the microcapsules 40 will be described later.

Preferably, the microcapsules 40 have substantially the same size as each other. This leads to an electrophoretic device 20 exhibiting superior display performance. The microcapsules 40 having uniform size can be prepared by, for example, filtration or classification according to specific gravity.

The average size of the microcapsules 40 is not particularly limited, but preferably about 10 to 150 μm, and more preferably about 30 to 100 μm.

In the resulting electrophoretic device 20, an electric field is generated by applying a voltage between the first electrode 3 and the second electrode 4, and the electrophoretic particles 5 are electrophoresed toward either electrode according to the electric field.

If positively charged electrophoretic particles 5a are used and the second electrode 4 has a positive potential, the electrophoretic particles 5 transfer to the first electrode 3 to come together, as shown in FIG. 2A. Thus, the color of the electrophoretic particles 5 can be seen when the electrophoretic device 20 is viewed from above (displaying side).

On the other hand, if the second electrode 4 has a negative potential, the electrophoretic particles 5 transfer to the second electrode 4 to come together, as shown in FIG. 2B. Thus, the color of the dispersion medium 6 can be seen when the electrophoretic device 20 is viewed from above (displaying side).

By appropriately setting the physical properties, such as color, electrical sign (positive or negative), and quantity of electric charge, of the electrophoretic particles 5, the polarity of the electrodes 3 and 4, and the potential difference between the electrodes 3 and 4, the displaying side of the electrophoretic device 20 snows desired information (image) according to the combination of the colors of the electrophoretic particles 5 and the dispersion medium 6.

The electrophoretic particles 5 preferably have a specific gravity substantial equal to that of the dispersion medium 6. Such electrophoretic particles 5 can remain a certain position in the dispersion medium 6 for a long time even after the voltage applied between the electrodes 3 and 4 is removed. Thus, the information displayed on the electrophoretic device 20 can be held for a long time.

A method for manufacturing the microcapsules 40 will now be described.

FIGS. 3A to 5 are schematic representations of a method for manufacturing the microcapsules according to the present embodiment.

The method includes: (1) forming droplets; and (2) forming capsule bodies.

Each step will now be described illustrating possible disperse states of the electrophoretic dispersion liquid. It should be noted that the disperse states described below include some estimations.

(1) Forming Droplets (First Step)

Figure 3A:
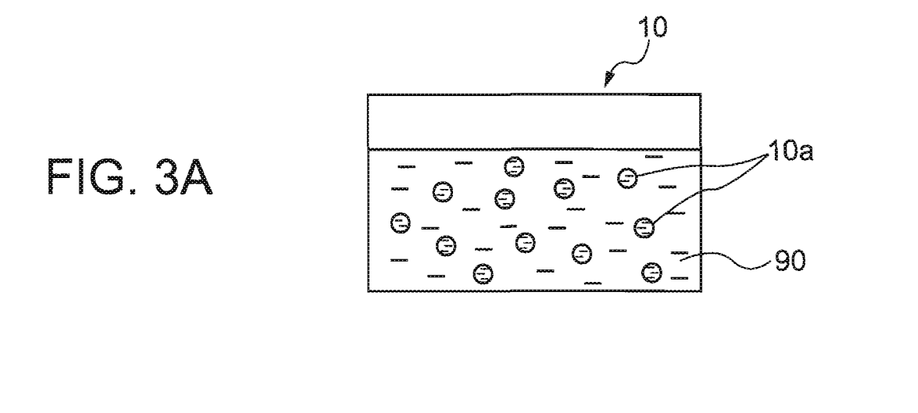
FIGS. 3A to 3C are schematic representations of a method for manufacturing microcapsules according to an embodiment of the invention.

First, an electrophoretic dispersion liquid 10 as described above is placed in an polar dispersion medium 90 and dispersed as shown in FIG. 3A to form droplets 10a.

Preferred examples of the polar dispersion medium 90 include waters, such as distilled water, ion-exchange water, pure water, ultrapure water, and reverse osmosis (RO) water, and mixtures of water and lower alcohols, such as methanol and ethanol.

The electrophoretic dispersion liquid 10 may be dripped into the polar dispersion medium 90, or poured into the polar dispersion medium 90 that is stirred. These techniques may be combined.

For stirring the polar dispersion medium 90, the stirring speed is preferably about 500 to 3,000 rpm, and more preferably about 1,000 to 2,000 rpm.

(2) Forming Capsule Bodies (Second Step)

Figure 3B:
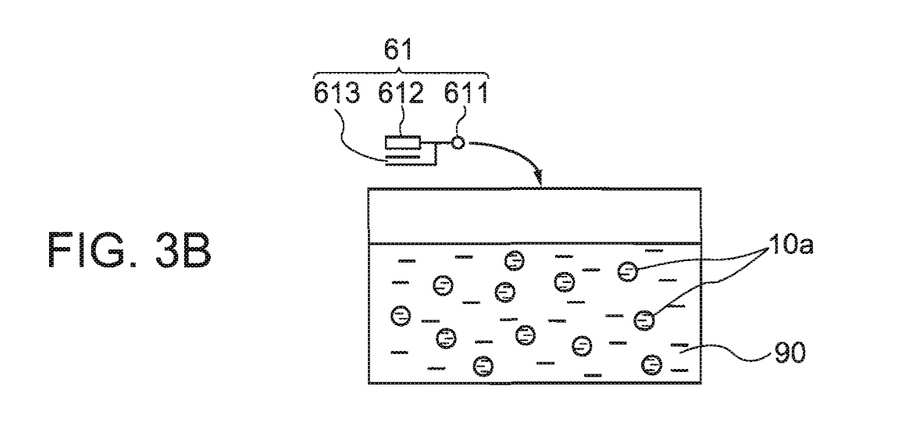

Turning then to FIG. 3B, a polymerizable surfactant 61 having a hydrophilic group 611, a hydrophobic group 612, and a polymerizable group 613 and a polymerization initiator are added to the polar dispersion medium 90.

Figure 4:
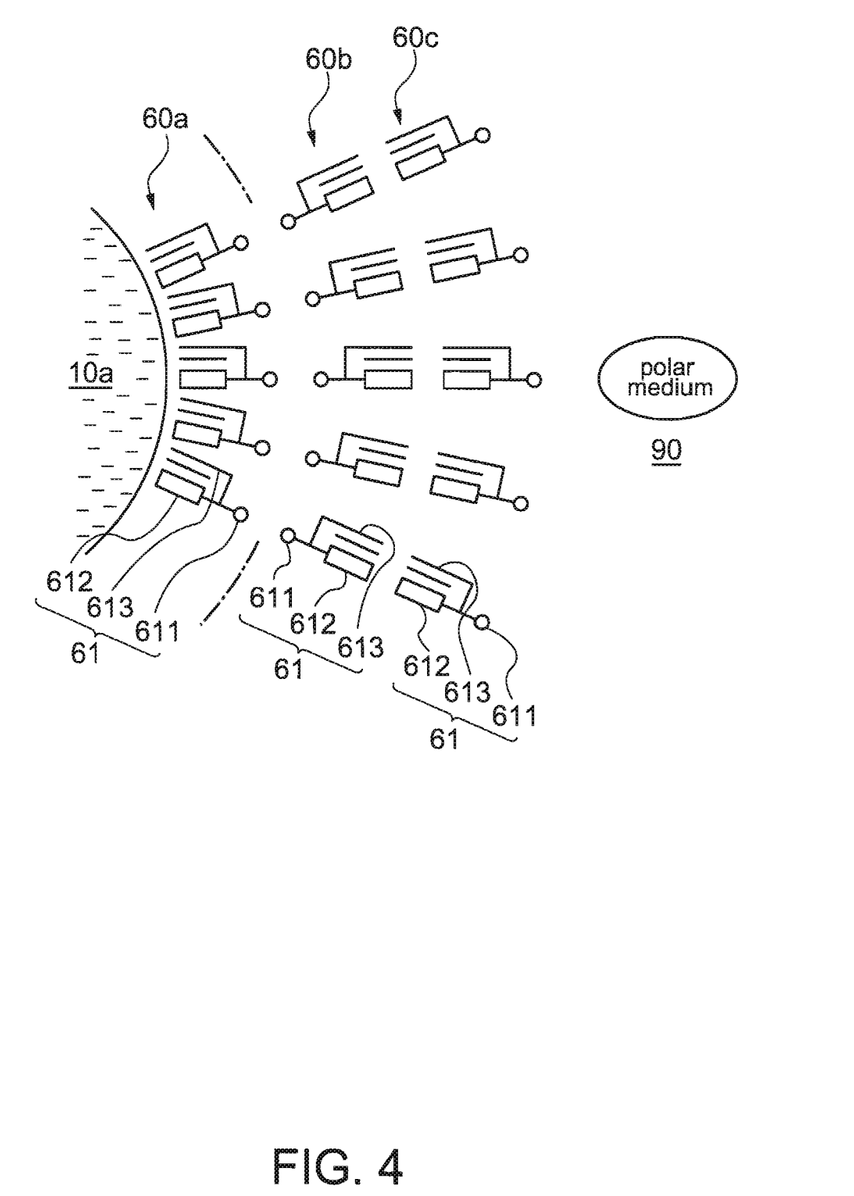
FIG. 4 is a schematic representation of a method for manufacturing microcapsules according to an embodiment of the invention.

Consequently, some molecules of the polymerizable surfactant 61 are oriented in such a manner that their hydrophobic groups 612 face to the droplet 10a, thus coating the droplet 10a to form a first coat 60a, as shown in FIG. 4. In this state, the hydrophilic groups 611 are oriented toward the polar dispersion medium 90.

Then, other molecules of the polymerizable surfactant 61 are oriented in such a manner that their hydrophilic groups 611 face to the first coat 60a, at a part of the outer surface of the first coat 60a or around the entire outer surface, thus forming a second coat 60b. In the same manner, a third coat 60c is formed, and thus a micelle is formed.

Figure 3C:
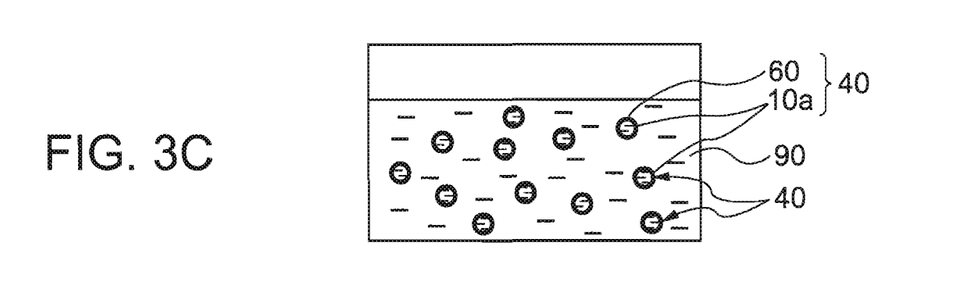
Figure 5:
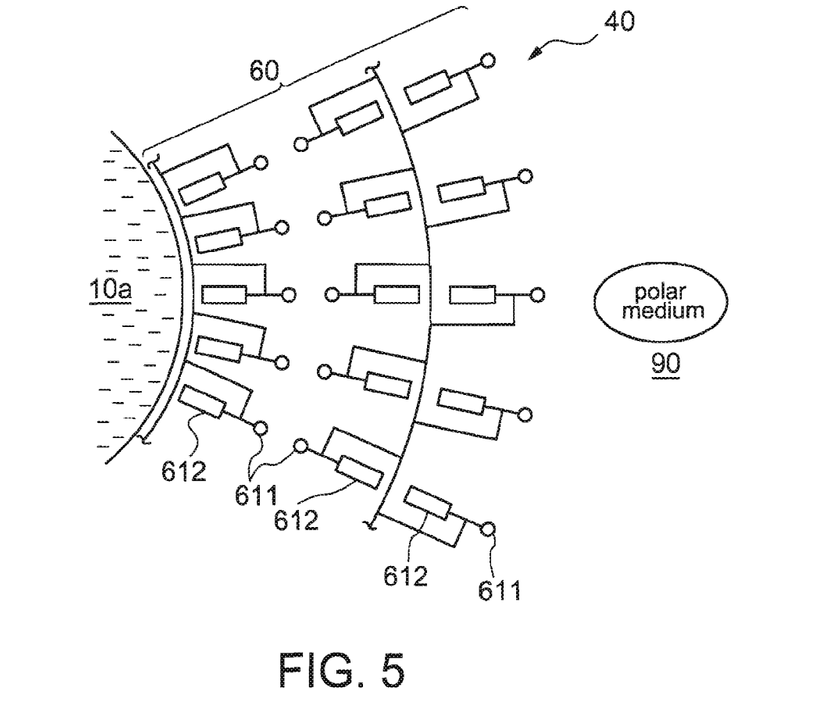
FIG. 5 is a schematic representation of a method for manufacturing microcapsules according to an embodiment of the invention.

In this state, the polymerization initiator acts on the polymerizable groups 613 of the polymerizable surfactant 61 to induce a polymerization reaction to form a polymer. Consequently, capsule bodies 60 are formed to prepare the microcapsules 40, as shown in FIGS. 3C and 5.

Preferably, the hydrophilic group 611 of the polymerizable surfactant 61 is at least either an anionic group or a nonionic group. This facilitates reliable formation of the micelle.

The anionic group is preferably selected from the group consisting of sulfonic, sulfonic, carboxyl and carbonyl groups and their salts. The nonionic group is preferably selected from the group consisting of hydroxy and oxyethylene groups. The polymerizable surfactant 61 having such a hydrophilic group 611 can easily form the micelle.

Preferably, the hydrophobic group 612 of the polymerizable surfactant 61 is at least either an alkyl group or an aryl group. These groups are not only hydrophobic, but also affinity for the dispersion medium 6 of the electrophoretic dispersion liquid 10.

The polymerizable group 613 of the polymerizable surfactant 61 can be a radically polymerizable unsaturated hydrocarbon. Preferably, the polymerizable group 613 is selected from the group consisting of vinyl, allyl, acryloyl, methacryloyl, propenyl, vinylidene, and vinylene. More preferably, the polymerizable group is acryloyl or methacryloyl. These polymerizable groups are reactive and hydrophobic.

Examples of the polymerizable surfactant 61 having an anionic group as the hydrophilic group 611 include: anionic allyl derivatives as disclosed in, for example, Japanese Examined Patent Application Publications Nos. 49-46291 and 1-24142 and Japanese Unexamined Patent Application Publication No. 62-104802; anionic propenyl derivatives as disclosed in, for example, Japanese Unexamined Patent Application Publication No. 62-221431; anionic acrylic acid derivatives as disclosed in, for example, Japanese Unexamined Patent Application Publication Nos. 62-34947 and 55-11525; and anionic itaconic acid derivatives as disclosed in, for example, Japanese Examined Patent Application Publication No. 46-34898 and Japanese Unexamined Patent Application Publication No. 51-30284.

For example, anionic surfactants suitably used as the polymerizable surfactant 61 can be expressed by general formula (31) or (32):

(31)

where $R^{21}$ and $R^{31}$ each represent a hydrogen atom or a hydrocarbon group having a carbon number of 1 to 12; $Z^1$ represents a carbon-carbon single bond or a group expressed by $-CH_2-O-CH_2-$; and m represent an integer of 2 to 20; X represents a group expressed by $-SO_3M^1$, wherein $M^1$ represents an alkali metal, an ammonium salt, or an alkanolamine.

(32)

where $R^{22}$ and $R^{32}$ each represent a hydrogen atom or a hydrocarbon group having a carbon number of 1 to 12; D represents a carbon-carbon single bond or a group expressed by $-CH_2-O-CH_2-$; n represents an integer of 2 to 20; and Y represents a group expressed by $-SO_3M^2$, wherein $M^2$ represents an alkali metal, an ammonium salt, or an alkanolamine.

Anionic polymerizable surfactants expressed by general formula (31) have been disclosed in Japanese Unexamined Patent Application Publication Nos. 5-320276 and 10-316909. By varying the $R^{21}$ and the m value of general formula (31), the hydrophobicity of the capsule body 60 can be controlled.

Anionic polymerizable surfactants expressed by general formula (31) include compounds expressed by general formula (310), and more specifically compounds expressed by formulas (31a) to (31d).

(310)

where $R^{31}$, m, and $M^1$ are the same as in general formula (31).

(31a)

(31b)

(31c)

-continued (31d)

Some of these anionic polymerizable surfactants are commercially available. Such surfactants include AQUALON RS series (AQUALON HS-05, HS-10, HS-20, and HS-1025) produced by Dai-ich Kogyo Seiyaku_Co., Ltd. and ADEKA REASOAP SE-10N and SE-20N produced by Asahi Denka Co., Ltd.

In ADEKA REASOAP SE-10N of Asahi Denka, $M^1$, $R^{31}$, and m of general formula (310) are $NH_4$, $C_9H_{19}$, and 10, respectively. In ADEKA REASOAP SE-20N of Asahi Denka, $M^1$, $R^{31}$, and m are $NH_4$, $C_9H_{19}$, and 20, respectively.

Other anionic surfactants suitably used as the polymerizable surfactant 61 can be expressed by general formula (33):

(33)

where p is 9 or 11; q represents an integer of 2 to 20; A represents a group expressed by $—SO_3M^3$, wherein $M^3$ represents an alkali metal, an ammonium salt, or an alkanolamine. For example, anionic polymerizable surfactants expressed by general formula (33) include compounds expressed by:

where r is 9 or 11, and s is 5 or 10.

Some of this type of anionic polymerizable surfactant are commercially available. Such surfactants include AQUALON KH series (AQUALON KH-5 and KH-10) produced by Dai-ich Kogyo Seiyaku Co., Ltd. AQUALON KH-5 is a mixture of a compound with an r value of 9 and an s value of 5 and a compound with an r value of 11 and an s value of 5. AQUALON KH-10 is a mixture of a compound with an r value of 9 and an s value of 10 and a compound with an r value of 11 and an s value of 10.

Other anionic surfactants suitably used as the polymerizable surfactant 61 can be expressed by general formula (34):

(34)

where R represents an alkyl group having a carbon number of 8 to 15; n represents an integer of 2 to 20; X represents a group expressed by $—SO_3B$, wherein B represents an alkali metal, an ammonium salt, or an alkanolamine.

Some of this type of anionic polymerizable surfactant are commercially available. Such surfactants include ADEKA REASOAP SR series (ADEKA REASOAP SR-10, SR-20, and SR-1025) produced by Asahi Denka Co., Ltd. ADEKA REASOAP SR series are compounds in which B of formula (34) represents $NH_4$: SR-10 has an n of 10; and SR-20 has an n of 20.

Other anionic surfactants suitably used as the polymerizable surfactant 61 can be expressed by general formula (A):

(A)

where $R^4$ represents a hydrogen atom or a hydrocarbon group having a carbon number of 1 to 12; l represents a number of 2 to 20; $M^4$ represents an alkali metal, an ammonium salt, or an alkanolamine.

Some of this type of anionic polymerizable surfactant are commercially available. Such surfactants include AQUALON HS series (AQUALON HS-10, HS-20, and HS-1025) produced by Dai-ich Kogyo Seiyaku Con, Ltd.

The polymerizable surfactant 61 can also be a sodium alkylallylsulfosuccinate expressed by general formula (35):

(35)

Some of this type of anionic polymerizable surfactant are commercially available. Among such surfactants is ELEMINOL JS-2 produced by Sanyo Chemical Industries, Ltd. In this compound, m of formula (35) is 12.

The polymerizable surfactant 61 can also be a sodium methacryloyloxypolyoxyalkylenesulfate expressed by general formula (36), wherein n is 1 to 20:

(36)

Some of this type of anionic polymerizable surfactant are commercially available. Among such surfactants is ELEMINOL RS-30 produced by Sanyo Chemical Industries, Ltd. In this compound, n of formula (36) is 9.

The anionic polymerizable surfactant 61 can also be expressed by general formula (37):

(37)

Some of this type of polymerizable surfactant are commercially available. Among such surfactants is Antox MS-60 produced by Nippon Nyukazai Co., Ltd.

The above-cited compounds can be used as the polymerizable surfactant 61 singly or in combination.

Examples of the polymerizable surfactant 61 having a nonionic group as the hydrophilic group 611 include compounds in which each anionic group of the above-cited anionic polymerizable surfactants is replaced with a hydroxy or oxyethylene group.

The content of the polymerizable surfactant 61 in the polar dispersion medium 90 is set so as to be more than or equal to the critical micelle concentration.

The polymerization initiator is preferably soluble in water. Water-soluble polymerization initiators include potassium persulfate, ammonium persulfate, sodium persulfate, 2,2-azobis-(2-methylpropioneamidine)dihydrochloride, and 4,4-azobis-(4-cyanovaleric acid).

The second step in the manufacturing method is preferably performed in a reaction vessel equipped with a stirrer, a reflux condenser, a dropping funnel, and a thermoregulator.

The polymerization initiator can be easily added by dripping a solution of a water-soluble polymerization initiator in pure water.

Preferably, the polymerization initiator is activated by heating the polar dispersion medium to a predetermined polymerization temperature (about 60 to 90° C.) After polymerization, the pH is adjusted in the range of 7.0 to 9.0, followed by filtration. The polar dispersion medium is a water-based solvent, as described above, and may contain a glycerol or a glycol.

In the second step, a comonomer capable of reacting with the polymerization surfactant 61 can be further added, in addition to the polymerizable surfactant 61 and the polymerization initiator.

One or both of a hydrophilic monomer and a hydrophobic monomer may be used as the comonomer. By adding the comonomer, the hydrophobicity of the capsule body 60 can be adjusted and the glass transition temperature of the copolymer forming the capsule body 60 can be controlled. Consequently, the capsule body 60 (microcapsules 40) can have good adhesion to the binder 41 and the electrodes 3 and 4.

The hydrophobic monomer has at least a hydrophobic group and a polymerizable group in its molecule.

Preferably, the hydrophobic group is selected from among aliphatic hydrocarbon, alicyclic hydrocarbon and aromatic hydrocarbon groups. Exemplary aliphatic hydrocarbon groups include methyl, ethyl, and propyl. Exemplary alicyclic hydrocarbon groups include cyclohexyl, dicyclopentenyl, dicyclopentenyl, and isobornyl. Exemplary aromatic hydrocarbon groups include benzyl, phenyl, and naphthyl. These groups have high hydrophobicity, and high affinity for the dispersion medium 6 of the electrophoretic dispersion liquid 10.

Among polymerizable groups preferred are unsaturated hydrocarbon groups capable of radical polymerization. Preferably, the polymerizable group is selected from the group consisting of vinyl, allyl, acryloyl, methacryloyl, propenyl, vinylidene, and vinylene. Acryloyl and methacryloyl groups are particularly preferable. These polymerizable groups are reactive and hydrophobic.

Examples of the hydrophobic monomer include styrene and styrene derivatives, such as methylstyrene, dimethylstyrene, chlorostyrene, dichlorostyrene, bromostyrene, p-chloromethylstyrene, and divinylbenzene; monofunctional acrylic esters, such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, and isobornyl acrylate; monofunctional methacrylic esters, such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, and isobornyl methacrylate; allyl compounds, such as allylbenzenes, allyl-3-cyclohexane propionates, 1-allyl-3,4-dimethoxybenzenes, allylphenoxy acetates, allylphenyl acetates, allylcyclohexanes, allyl polyvalent carboxylates; esters, such as fumarates, maleates, and itaconates; N-substituted maleimide; and cyclic olefins.

The hydrophilic monomer has at least a hydrophilic group and a polymerizable group in its molecule.

Preferably, the hydrophilic group is selected from the group consisting of sulfonic, sulfonic, carboxyl and carbonyl groups and their salts, hydroxy group, oxyethylene group, amido group, and amino group.

The polymerizable group is the same as those listed for the hydrophobic monomer.

Examples of the hydrophilic monomer include OH group-including acrylic or methacrylic alkyl esters, such as 2-hydroxyethyl methacrylate, 2-hydroxypropyl methacrylate, and 2-hydroxybutyl methacrylate; ethylene oxide-group including acrylic or methacrylic esters, such as ethyl diethylene glycol acrylate, polyethylene glycol monomethacrylate, and methoxy polyethylene glycol methacrylate; amides, such as acrylamide and N,N-dimethylacrylamide; amino group-including acrylic or methacrylic acid alkylamino esters, such as N-methylaminoethyl methacrylate, N-methylaminoethyl, acrylate, dimethylaminoethyl methacrylate, dimethylaminoethyl acrylate, diethylaminoethyl methacrylate, and diethylaminoethyl methacrylate; alkylamino group-including unsaturated amides, such as N-(2-dimethylaminoethyl) acrylamide, N-(2-dimethylaminoethyl)methacrylamide, and N,N-dimethylaminopropylacrylamide; monovinylpyridines, such as vinylpyridine; alkylamino group-including vinyl ethers, such as dimethylaminoethyl vinyl ether; vinylimidazole; and N-vinyl-2-pyrrolidone.

The type of the hydrophobic and/or hydrophilic monomer and their contents are appropriately set according to the hydrophobicity of the polymerizable surfactant 61 and the hydrophobicity of the desired capsule body 60.

The above-described method facilitates reliable formation of the microcapsules 40 in the polar dispersion medium 90.

The method can also reduce by-products, such as water-soluble oligomers and polymers. Consequently, the viscosity of the polar dispersion medium 90 in which the microcapsules 40 are dispersed can be reduced. This facilitates purification, such as ultrafiltration.

The polymerization initiator may be added to the polar dispersion medium 90 separately from the polymerizable surfactant 2 and the comonomer.

The microcapsules 40 are thus prepared through the above-described steps.

The second step may be performed in the manner described below to form the capsule bodies 60.

In the following description, as an example, the compound expressed by formula (31b) is used as the polymerizable surfactant 61.

Figure 10A:
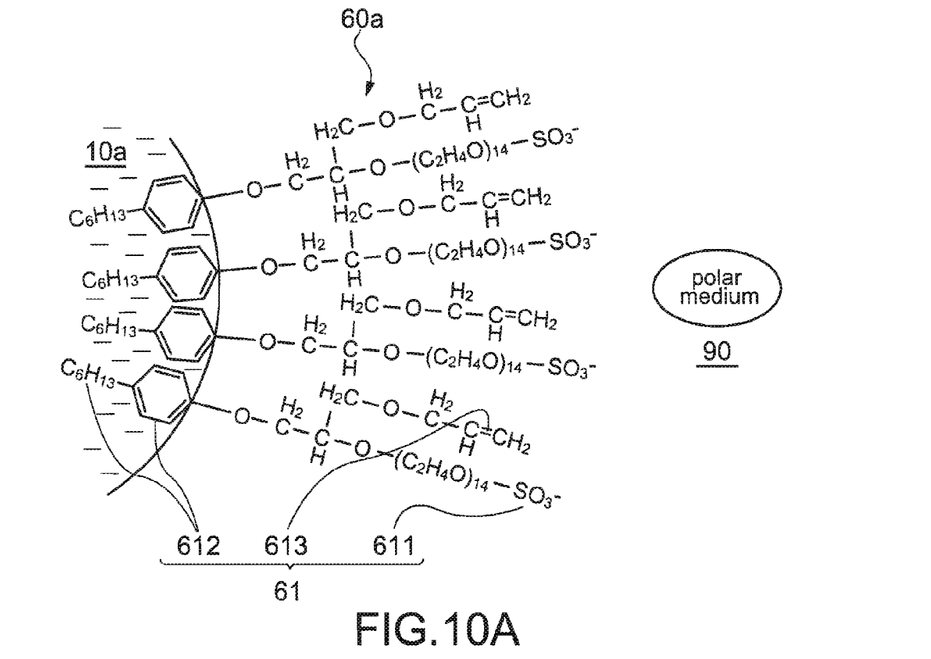
FIGS. 10A and 10B are schematic representations of a method for manufacturing microcapsules according to another embodiment of the invention, wherein the method is illustrated using the constitutional formula of a polymerizable surfactant expressed by formula 31b.
Figure 10B:
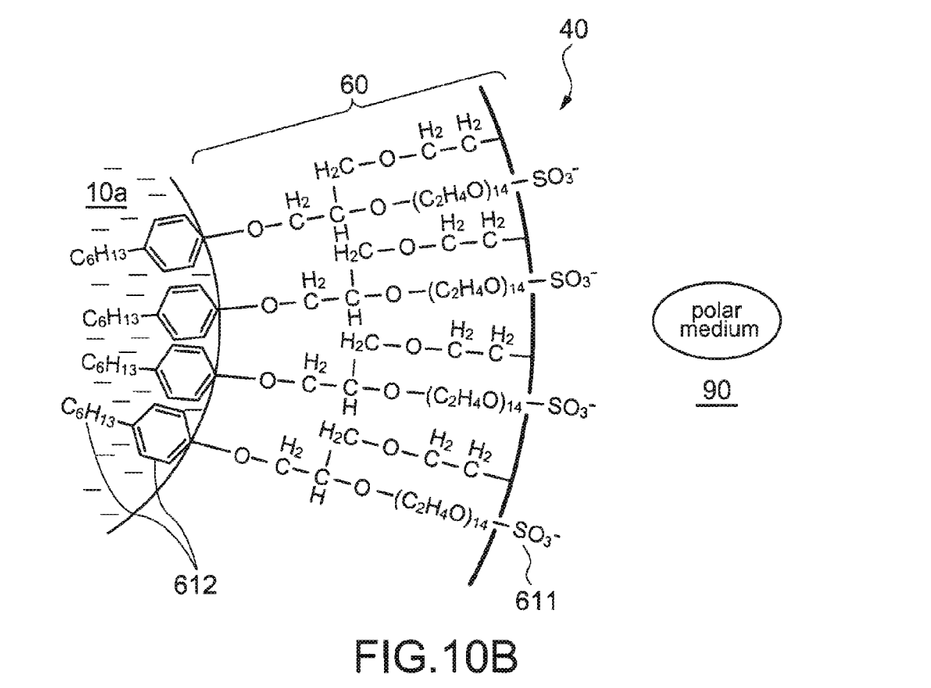

FIGS. 10A and 10B are schematic representations of a modification of the method for manufacturing microcapsules according the present embodiment. In the figures, the compound expressed by formula (31b) is used as the polymerizable surfactant 61.

Each step will now be described.

First, the electrophoretic dispersion liquid 10 is dispersed in the polar dispersion medium 90 in the same manner as in the first step.

Then, a polymerizable surfactant 61 having a hydrophilic group 611, a hydrophobic group 612 and a polymerizable group 613 is added to the polar dispersion medium 90.

Consequently, the polymerizable surfactant 61, for example, an anionic polymerizable surfactant, is ionized into positive ions and negative ions. The positive ions are dissolved in the polar dispersion medium 90, and the negative ions including the ions of the hydrophobic group 612 and the polymerizable group 613 are dispersed in the polar dispersion medium 90.

Consequently, the molecules of the polymerizable surfactant 61 are oriented in such a manner that their hydrophobic groups 612 face to the droplet 10a, thus coating the droplet 10a to form a first coat 60a, as shown in FIG. 10A.

In use of the alkylphenyl group expressed by formula (31b) as the hydrophobic group 612, each hydrophobic group 612 is located by the internal surface of the droplet 10a.

Although the description of this modification is described using an alkylphenyl group as the hydrophobic group 612, the hydrophobic group 612, or the polymerizable surfactant 61 having the hydrophobic group 612, is appropriately selected depending on the composition of the dispersion medium 6.

Preferably, a hydrophobic group compatible with the dispersion medium 6 is selected as the hydrophobic group 612. Such a hydrophobic group 612 can easily enter the droplet 10a, so that the molecules of the polymerizable surfactant 61 can be certainly aligned at the surface of the droplet 10a.

On the other hand, the hydrophilic group 611, or the sulfonic group, faces the polar dispersion medium 90.

The polymerizable group 613, or the vinyl group, and the oxyethylene group between the hydrophobic group 612 and the hydrophilic group 611 have higher hydrophilicities than the hydrophobic group 612, and are therefore rather away from the droplet 10a, as shown in FIG. 10A.

The behaviors of the groups of the polymerizable surfactant 61 allow its particles 50 to be aligned so as to cover the surface of the droplet 13a, thus forming the first coat 60a, as shown in FIG. 10A.

Then, a polymerization initiator is added to the polar dispersion medium 90 to induce polymerization reaction, so that each polymerizable group 613 of the molecules of the polymerizable surfactant 61 bind to the adjacent polymerizable groups 613 in the first coat 60a.

In the following description for the polymerization reaction, ammonium persulfate is used as the polymerization initiator as an example.

On adding ammonium persulfate to polar dispersion medium 90, the oxygen-oxygen (O—O) bond of the ammonium persulfate is broken to be a free radical. The free radical reacts with one electron of the shared electron pair (two n electrons) forming the π bond of the vinyl group (polymerizable group 613) in the polymerizable surfactant 61. Consequently, the other π electron is turned unpaired and hence becomes a free radical. The free radical react with a π electron of the vinyl group in an adjacent molecule of the polymerizable surfactant 61 to form a new free radical and crosslink the two adjacent molecules of the polymerizable surfactant 61. By the progress of this chain reaction between the adjacent molecules of the polymerizable surfactant 61, the first coat 60a is polymerized to form a capsule body 60 as shown in FIG. 10B.

The microcapsules 40 can be prepared by this process.

Which of the structures shown in FIGS. 5 and 10B the microcapsules 40 has can be selected by controlling the content of the polymerizable surfactant 61.

For example, by adding a relatively large amount of polymerizable surfactant 61 to the polar dispersion medium 90, the microcapsules 40 tends to have a structure as shown in FIG. 5. In contrast, by adding a relatively small amount of polymerizable surfactant 61 to the polar dispersion medium, the microcapsules 40 tends to have a structure as shown in FIG. 10B.

The resulting microcapsules 40 is formed of an organic polymer capsule body 60 having a plurality of hydrophobic groups 612, and is accordingly hydrophobic and moisture-resistant. Therefore, the water content in the microcapsules 40 can be prevented from increasing with timer and thus the characteristics (display performance) of the electrophoretic device 20 can be advantageously maintained.

Second Embodiment

An electrophoretic device according to a second embodiment of the invention will now be described.

Figure 6:
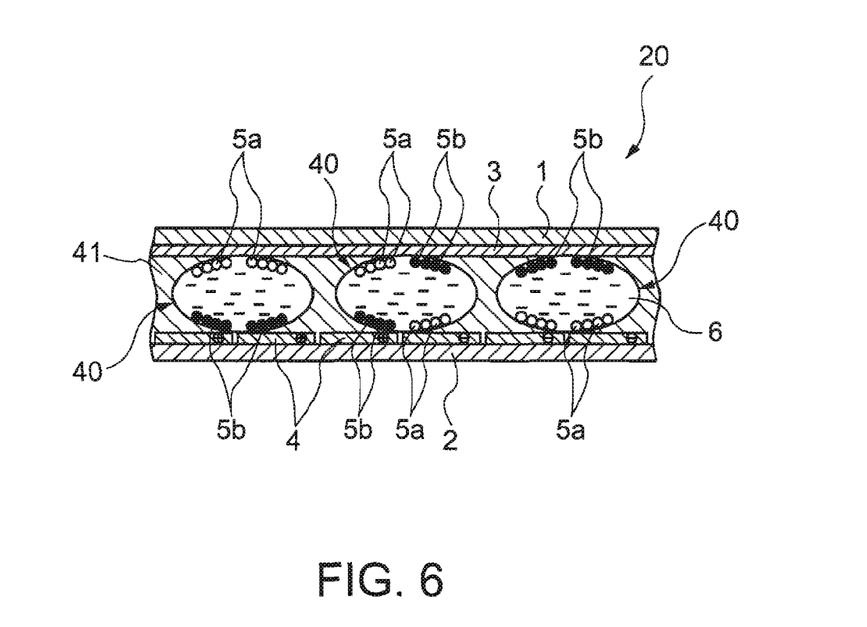
FIG. 6 is a longitudinal sectional view of an electrophoretic device according to a second embodiment of the invention.

FIG. 6 is a longitudinal sectional view of an electrophoretic device according to the second embodiment.

The following description of the electrophoretic device according to the second embodiment will mainly describe differences from the electrophoretic device according to the first embodiment, and the same description may not be repeated.

The electrophoretic device 20 of the second embodiment is the same as that of the first embodiment, except that the dispersion medium 6 contains plural types of electrophoretic particles having different properties. For example, two types of electrophoretic particles 5a and 5b having their respective colors (hues) and respective charges are dispersed. The other features are the same as in the electrophoretic device 20 of the first embodiment.

In the present embodiment, the electrophoretic particles are constituted of a type of electrophoretic particles 5a having a positive charge and being white in color and the other type of electrophoretic particles 5b having a negative charge and being black in color.

In such an electrophoretic device 20, if the second electrode 4 has a positive potential, the positively charged electrophoretic particles 5a transfer toward the first electrode 3 to come together. On the other hand, the negatively charged electrophoretic particles 5b transfer toward the second electrode 4 to come together.

If the second electrode 4 has a negative potential, the positively charged electrophoretic particles 5a transfer toward the second electrode 4 to come together, and the negatively charged electrophoretic particles 5b transfer toward the first electrode 3 to come together.

Thus, the electrophoretic particles are differently seen according to the combination of the polarities of the second electrode 4, as shown in FIG. 6. For example, In the left microcapsules 40 in FIG. 6, the color of the white electrophoretic particles 5a is seen when the electrophoretic device 20 is viewed from above (displaying side) In the center microcapsules 40, the mixed color (gray, of the white electrophoretic particles 5a and the black electrophoretic particles 5b is seen from above. In the right microcapsules 40, the color of the black electrophoretic particles 5b is seen from above.

Thus, the electrophoretic device 20 can display images with many color gradations.

Although FIG. 6 shows that substantially the same number of electrophoretic particles 5a and electrophoretic particles 5b are dispersed in the dispersion medium 6, the numbers of these types of particles may be set according to the application.

The average particle sizes of the electrophoretic particles 5a and 5b may be the same or different.

One of the microcapsules 40 may contain an identical type of electrophoretic particles, and another may contain another type of electrophoretic particles. The type of electrophoretic particles may thus be varied for each microcapsules.

The electrophoretic device 20 of the second embodiment can produce the same effects as that of the first embodiment.

Third Embodiment

An electrophoretic device according to a third embodiment of the invention will now be described.

Figure 7:
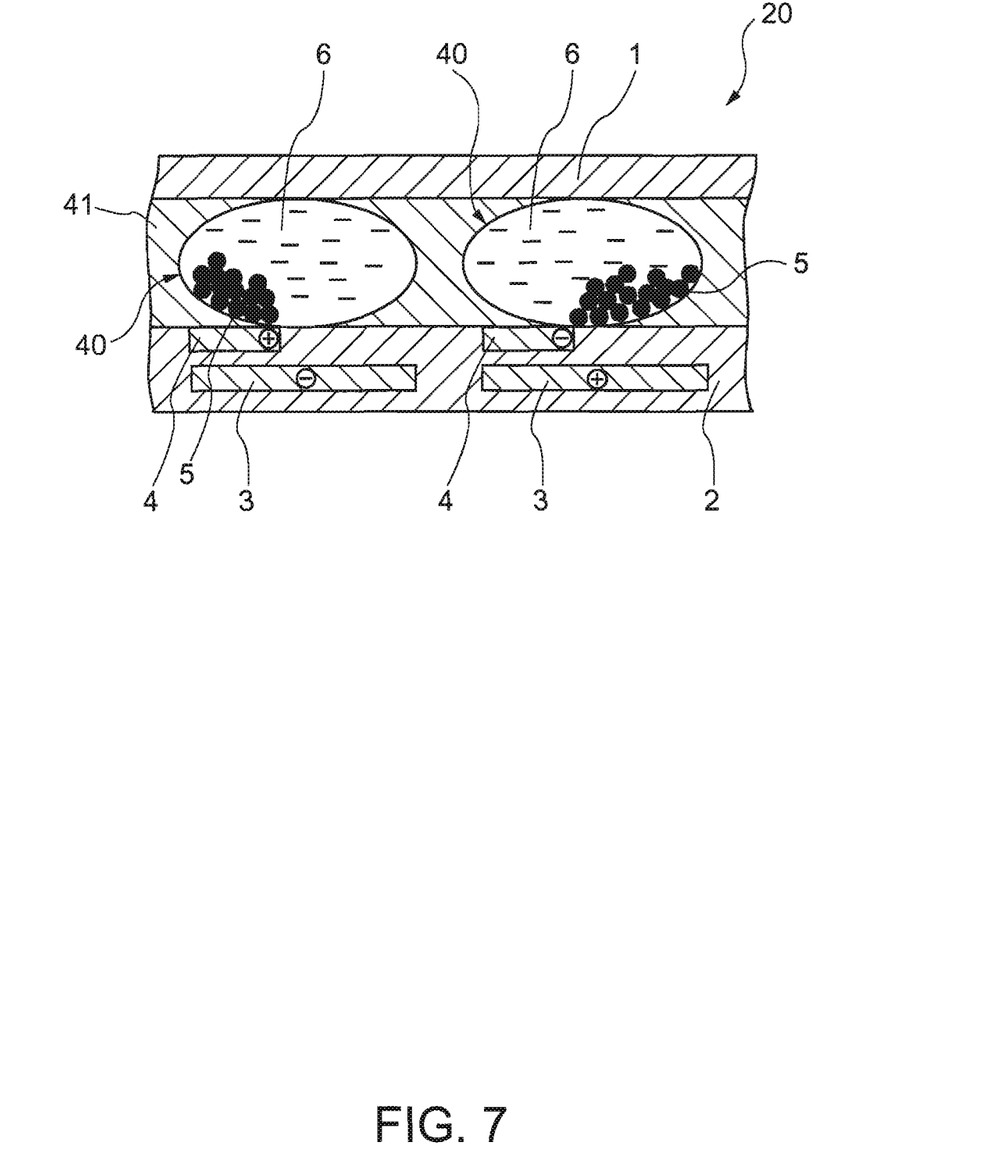
FIG. 7 is a longitudinal sectional view of an electrophoretic device according to a third embodiment of the present invention.

FIG. 7 is a longitudinal sectional view of the electrophoretic device according to the third embodiment.

The following description of the electrophoretic device according to the third embodiment will mainly describe differences from the electrophoretic device according to the first embodiment, and the same description may not be repeated.

The electrophoretic device 20 of the third embodiment is the same as that of the first embodiment, except for the construction including arrangement of the first and second electrodes 3 and 4.

Specifically, in the third embodiment, the second substrate 2 has second electrodes 4 and first electrodes 3 larger than the second electrodes 4 in such a manner that the second electrode 4 overlies the respective first electrode 3.

In the present embodiment, negatively charged black (colored) electrophoretic particles are used as the electrophoretic particles 5, and the second substrate 2 is white in color and the second electrode 4 is black in color (colored).

In such an electrophoretic device 20, if the second electrodes 4 have a positive potential, the electrophoretic particles 5 transfer toward the second electrodes to come together.

On the other hand, if the second electrodes 4 have a negative potential, the electrophoretic particles 5 transfer toward the exposed portions of the first electrodes 3 not covered with the second electrodes 4 to come together.

Thus, the electrophoretic particles are differently seen according to the combination of the polarities of the second electrode 4, as shown in FIG. 7. For example, the left microcapsules 40 exhibits black color on the left side due to the color of the electrophoretic particles 5, and white color on the right side due to the color of the second substrate 2, when the electrophoretic device 20 is viewed from above. The right microcapsules 40 exhibits black color as a whole due to the colors of the electrophoretic particles 5 and the second electrode 4.

In addition, the electrophoretic device 20 can maintain the state of the electrophoretic particles 5 even after the electrical power to the first electrode 3 and the second electrode 4 is removed. For example, in the left microcapsules 40, the electrophoretic particles 5 are held in such a state as to be drawn to the first electrode 3 by the electrostatic attraction generated between the overlapped portions of the first electrode 3 and the second electrode 4. In the right microcapsule 40, the electrophoretic particles 5 are held in such a state as to be repelled toward the first electrode 3 by the electrostatic repulsion generated between the overlapped portions of the first electrode 3 and the second electrode 4.

Furthermore, the amount of the electrophoretic particles 5 transferring between the second electrode 4 and the exposed portion of the first electrode 3 not covered with the second electrode 4 can be set by controlling the voltage applied to the electrodes 3 and 4, the time for which the voltage is applied, and other conditions. Thus, the electrophoretic device 20 can display images with many color gradations.

The electrophoretic device 20 of the second embodiment can produce the same effects as that of the first embodiment.

The electrophoretic device 20 can be incorporated into a variety of electric apparatuses. Electric apparatus including the electrophoretic device 20 will be described.

Electric Paper

An electric apparatus used as an electric paper according to an embodiment will now be described.

Figure 8:
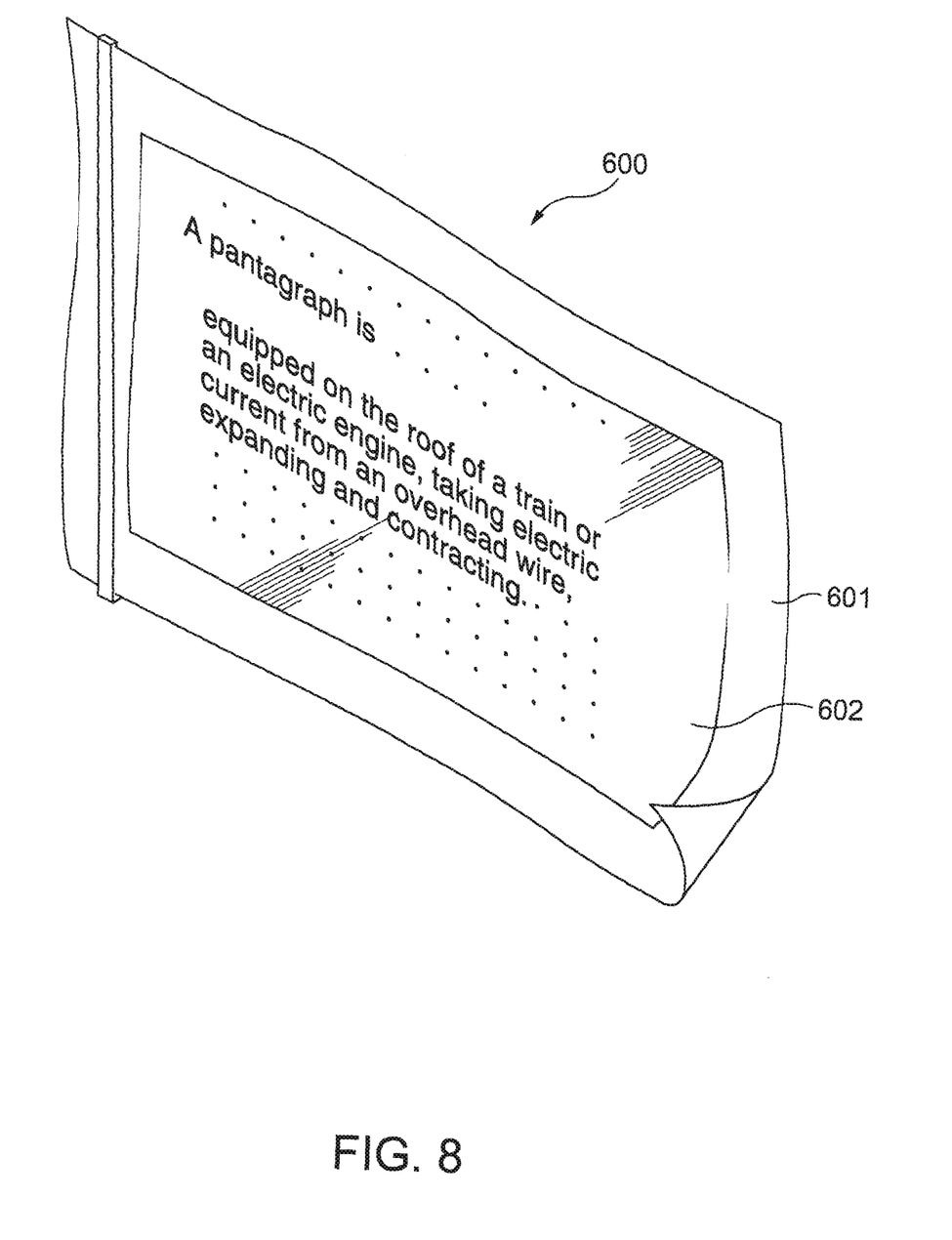
FIG. 8 is a perspective view of an electric apparatus used as an electric paper according to an embodiment of the present invention.

FIG. 8 is a perspective view of an electric apparatus according to an embodiment that is used as an electric paper.

The electric paper 600 shown in FIG. 8 includes a main body 601 made of a rewritable sheet and a display unit 602. The rewritable sheet has flexibility and texture similar to those of paper.

The display unit 602 of the electric paper 600 is defined by the electrophoretic device 20.

Display

An electric apparatus used as a display according to an embodiment will now be described.

Figure 9A:
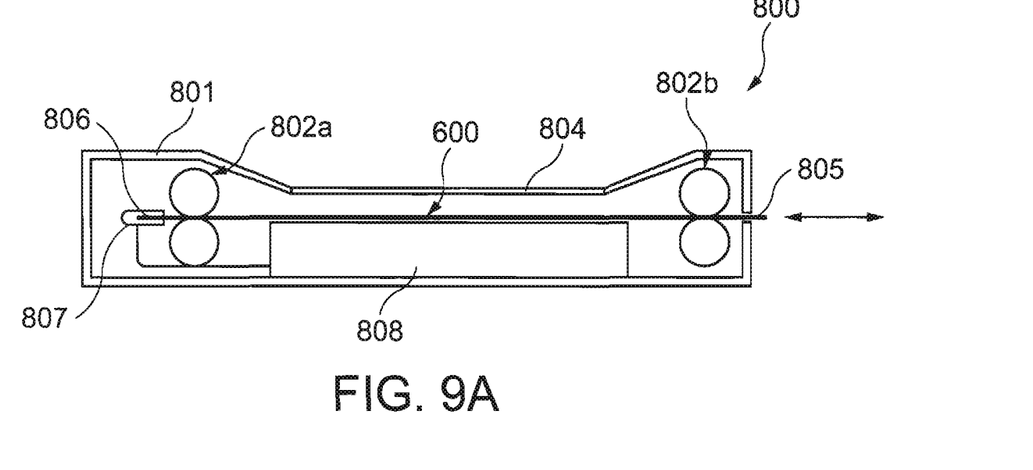
FIGS. 9A and 9B are a schematic sectional view and a plan view of an electric apparatus used as a display device according to an embodiment of the present invention.
Figure 9B:
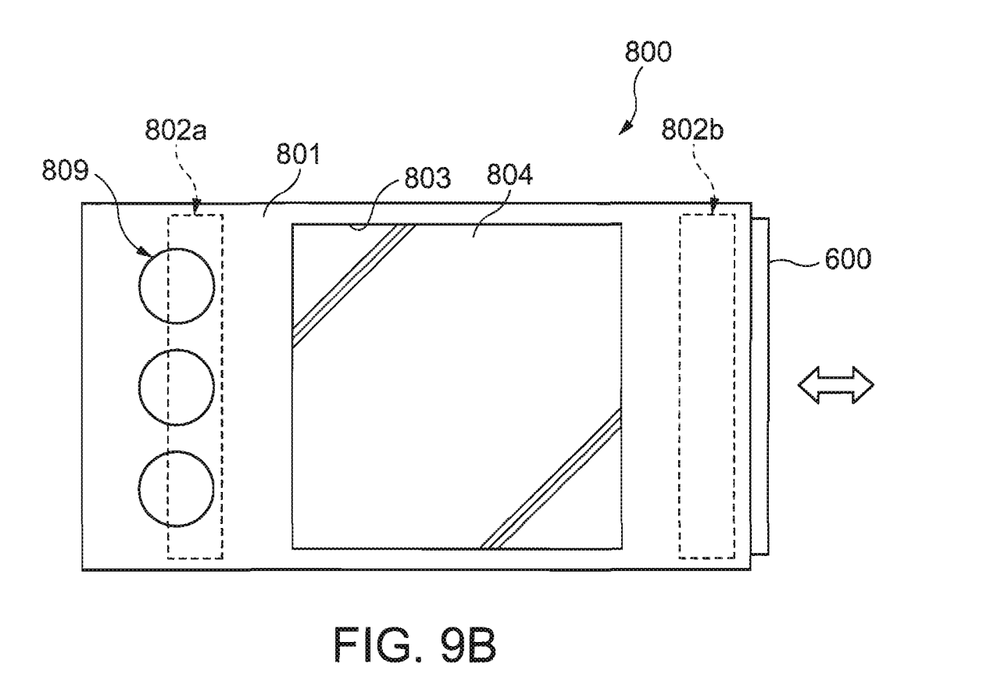

FIG. 9A is a sectional view of an electric apparatus according to an embodiment that is used as a display, and FIG. 9B is a plan view of the display.

The display 800 shown in FIGS. 9A and 9B includes a main body 801 and a removable electric paper 600 provided in the main body 801. The electric paper 600 has the same structure as shown In FIG. 7.

The main body 801 has a loading slot 805 from which the electric paper 600 is inserted, at its side (right side in FIG. 9A) and two pairs of transfer rollers 802a and 802b. On inserting the electric paper 600 into the main body 801 from the loading slot 805, the electric paper 600 is caught between the pairs of transport rollers 802a and 802b and thus disposed in the main body 801.

A rectangular opening 803 is formed in the displaying side (front side in FIG. 9B) of the main body 801, and a transparent glass plate 804 is embedded in the opening 803. The electric paper 600 in the body 801 can be seen through the glass plate 804 from the outside. In other words, the display 800 shows the electric paper 600 disposed in the body 801 through the transparent glass plate 804, thereby defining a screen.

The display device has a terminal 806 at the position (left in FIG. 9A) of the end of the inserted electric paper 600, and a socket 807 inside the main body 801. The terminal 806 is connected to the socket 807, with the electric paper 600 disposed in the main body 801. The socket 807 is electrically connected to a controller 808 and an operating portion 809.

Since the electric paper 600 is removably installed in the main body 801 of the display 800, the electric paper 600 can be removed from the main body 801 and carried.

The electric paper 600 of the display 800 includes the above-described electrophoretic device 20.

In addition, the electrophoretic device 20 can be used for displaying portions of other electric apparatuses, such as TV sets, viewfinder-type and monitor-direct-view-type video tape recorders, car navigation systems, pagers, electronic notebooks, electronic calculators, electronic newspapers, word processors, personal computers, work stations, videophones, POS terminals, and other apparatuses with touch panels.

While the invention has been described using the exemplary embodiments with reference to the drawings, it will be readily appreciated by those skilled in the art that various modifications in form and detail may be made without departing from the scope and sprit of the invention as understood from the specification and the appended claims.

The electrophoretic device of the invention may be a combination of at least two forms according to the exemplary embodiments.

EXAMPLES

Examples of the inventions will now be described.

1. Electrophoretic Device Preparation

Example 1

(1) First, 10 percent by weight of electrophoretic particles with an average particle size of 0.5 μm were dispersed in a solution of anthraquinone blue in dodecyl benzene to prepare an electrophoretic dispersion liquid. $TiO_2$ particles surface-modified with a coupling agent were used as the electrophoretic particles.

(2) The resulting electrophoretic dispersion liquid was dripped into pure water (polar dispersion medium) that was being stirred at 1,500 rpm, and was thus dispersed.

(3) Then, the anionic polymerizable surfactant expressed by formula (31b) and ammonium persulfate (polymerization initiator) were mixed to the electrophoretic dispersion liquid. The mixture was stirred at 60° C. for 24 hours.

(4) After 24 hours, the pH of the electrophoretic dispersion liquid was adjusted to about 7.0 and the electrophoretic dispersion liquid was filtered to separate microcapsules out.

The resulting microcapsules had an average particle size of about 50 μm.

(5) Subsequently, an electrophoretic device as shown in FIG. 1 was produced using the microcapsules. The specifications of the electrophoretic device were as follows:
First and Second Substrates
 Dimensions: 50 mm in length by 50 mm in width by 100 μm in thickness
 Material: Polyethylene
First and Second Electrodes
 Dimensions: 40 mm in length by 40 mm in width by 4 μm in thickness
 Material: ITO
Binder
 Material: ABS resin Example 2

An electrophoretic device was produce using microcapsules prepared in the same manner as in Example 1, except that in the above step (3), a nonionic polymerizable surfactant was used as the polymerizable surfactant. The nonionic polymerizable surfactant was based on the compound expressed by formula (31a) and whose anionic group was placed with the hydroxy group.

Example 3

An electrophoretic device was produced using microcapsules prepared in the same manner as in Example 1, except that in the above step (3), ethyl acrylate (hydrophobic monomer) was further added as the comonomer together with the polymerizable surfactant and the polymerization initiator.

Example 4

An electrophoretic device was produced using microcapsules prepared in the same manner as in Example 1, except that in the above step (3), methoxypolyethylene glycol methacrylate (hydrophilic monomer) was further added as the comonomer together with the polymerizable surfactant and the polymerization initiator.

Comparative Example

An electrophoretic device was produced using microcapsules prepared in the same manner as in Example 1, but by coacervation using gelatin and gum arabic.

2. Evaluation

Humidity Test

The electrophoretic device s of the examples and comparative example were allowed to stand at 80° C. and 90% RH for 24 hours.

Each of the electrophoretic device s of the examples was able to work as immediately after their production, even after the completion of the humidity test.

On the other hand, the electrophoretic device of the comparative example did not work after the humidity test.

What is claimed is:

1. A method of manufacturing microcapsules, individual microcapsules including a capsule shell and an electrophoretic dispersion liquid encapsulated by the capsule body, the capsule shell being made of an organic polymer, the electrophoretic dispersion liquid including electrophoretic particles in a dispersion medium, the method comprising:
 forming droplets of the electrophoretic dispersion liquid by dispersing the electrophoretic dispersion liquid in a polar dispersion medium; and
 forming an entirety of each capsule shell as a result of polymerizing a polymerizable surfactant in the presence of a polymerization initiator by mixing the polymerization initiator and the polymerizable surfactant with the polar dispersion medium, the polymerizable surfactant having a hydrophilic group, a hydrophobic group and a polymerizable group, so as to coat the droplets with the polymerizable surfactant and inducing a polymerization reaction to form the organic polymer,
 thereby obtaining the microcapsules.

2. A method of manufacturing microcapsules, individual microcapsules including a capsule shell and an electrophoretic dispersion liquid encapsulated by the capsule body, the capsule shell being made of an organic polymer, the electrophoretic dispersion liquid including electrophoretic particles in a dispersion medium, the method comprising:

forming droplets of the electrophoretic dispersion liquid by dispersing the electrophoretic dispersion liquid in a polar dispersion medium; and forming an entirety of each capsule shell as a result of copolymerizing a polymerizable surfactant and a comonomer in the presence of a polymerization initiator by mixing the polymerizable surfactant, the comonomer, and the polymerization initiator with the polar dispersion medium, the polymerizable surfactant having a hydrophilic group, a hydrophobic group and a polymerizable group, the comonomer being polymerizable with the polymerizable surfactant, so as to coat the droplets with the polymerizable surfactant and the comonomer and inducing a polymerization reaction to form the organic polymer, thereby obtaining the microcapsules.

3. The method according to claim 2, wherein the comonomer is at least one of a hydrophilic monomer and a hydrophobic monomer.

4. The method according to claim 3, wherein the comonomer is a hydrophilic monomer having a hydrophilic group and a polymerizable group in the molecule thereof, the hydrophilic group being selected from the group consisting of sulfonic, sulfinic, carboxyl and carbonyl groups and salts thereof, a hydroxy group, an oxyethylene group, an amido group, and an amino group.

5. The method according to claim 3, wherein the comonomer is a hydrophobic monomer having a hydrophobic group and a polymerizable group in the molecule thereof, the hydrophobic group being selected from the group consisting of aliphatic hydrocarbon groups, alicyclic hydrocarbon groups, and aromatic hydrocarbon groups.

6. The method according to claim 2, wherein the comonomer has an unsaturated hydrocarbon group capable of radical polymerization.

7. The method according to claim 6, wherein the unsaturated hydrocarbon group is selected from the group consisting of vinyl, allyl, acryloyl, methacryloyl, propenyl, vinylidene, and vinylene.

8. The method according to claim 1, wherein the dispersion medium is an organic solvent having a lower polarity than the polar dispersion medium.

9. The method according to claim 8, wherein the organic solvent is selected from the group consisting of aromatic hydrocarbons, aliphatic hydrocarbons, hydrocarbon mixtures, halogenated hydrocarbons, silicone oils, and fluorinated solvents.

10. The method according to claim 1, wherein the polymerizable group of the polymerizable surfactant is an unsaturated hydrocarbon group capable of radical polymerization.

11. The method according to claim 10, wherein the unsaturated hydrocarbon group is selected from the group consisting of vinyl, allyl, acryloyl, methacryloyl, propenyl, vinylidene, and vinylene.

12. The method according to claim 11, wherein the hydrophilic group of the polymerizable surfactant is at least one of an anionic group and a nonionic group.

13. The method according to claim 12, wherein the hydrophilic group is an anionic group selected from the group consisting of sulfonic, sulfinic, carboxyl and carbonyl groups and salts thereof.

14. The method according to claim 12, wherein the hydrophilic group is a nonionic group selected from the group consisting of hydroxy and oxyethylene groups.

15. The method according to claim 1, wherein the hydrophobic group of the polymerizable surfactant is at least one of an alkyl group and an aryl group.

16. The method according to claim 1, wherein the hydrophobic group of the polymerizable surfactant is compatible with the dispersion medium.

17. A method of manufacturing an electrophoretic device comprising:

disposing a plurality of microcapsules on a substrate, the microcapsules being manufactured according to the method of claim 1.

18. A method of manufacturing an electric apparatus comprising:

disposing the electrophoretic device using the method of manufacturing the electrophoretic device according to claim 17.

19. The method according to claim 1, wherein the microcapsules have an average size of from about 10 to 150 μm.

20. The method according to claim 2, wherein the microcapsules have an average size of from about 10 to 150 μm.

* * * * *